United States Patent [19]

Atwell et al.

[11] Patent Number: 5,840,242
[45] Date of Patent: Nov. 24, 1998

[54] AMORPHOUS SILICON OXYCARBIDE AND CRYSTALLINE SILICON CARBIDE FIBERS FROM CURABLE ALKENYL OR ALKYNYL FUNCTIONAL SILOXANE RESINS

[75] Inventors: William Henry Atwell, Midland; Duane Ray Bujalski, Auburn; Jonathan Lipowitz; Kai Su, both of Midland, all of Mich.; Gregg Alan Zank, Tokyo, Japan

[73] Assignee: Dow Corning Corporation, Midland, Mich.

[21] Appl. No.: 837,664

[22] Filed: Apr. 22, 1997

[51] Int. Cl.⁶ .................................................. C04B 35/571
[52] U.S. Cl. .......................... 264/470; 264/473; 264/477; 264/625; 264/627; 264/82; 264/83
[58] Field of Search ..................... 264/625, 627, 264/83, 470, 477, 82, 473

[56] References Cited

U.S. PATENT DOCUMENTS

| | | | |
|---|---|---|---|
| 4,100,233 | 7/1978 | Yajima et al. | 264/625 |
| 4,289,720 | 9/1981 | Yajima et al. | 264/625 |
| 5,071,600 | 12/1991 | Deleeuw et al. | 264/22 |
| 5,167,881 | 12/1992 | Atwell et al. | 264/22 |
| 5,268,336 | 12/1993 | Deleeuw et al. | 501/88 |
| 5,358,674 | 10/1994 | Rabe | 264/22 |
| 5,366,943 | 11/1994 | Lipowitz et al. | 501/95 |

FOREIGN PATENT DOCUMENTS 2266301 10/1993 United Kingdom.

OTHER PUBLICATIONS

High Temperature Cehmistry of the Conversion of Siloxanes to Silicon Carbide. Burns, Taylor, Xu, Zangvil, Zank: Dow Corning Corporation, Chemistry of Materials 1992. vol. 4 #6, pp. 1313–1323.

*Primary Examiner*—James Derrington
*Attorney, Agent, or Firm*—Sharon K. Severance

[57] ABSTRACT

The present invention relates to a method for preparing a ceramic fiber from alkenyl or alkynyl functional resins and to the ceramic fibers produced therefrom. The method comprises (A) forming a fiber from a siloxane resin comprised of $R^1_a R^2_b RSiO_{(3-a-b)/2}$ units wherein R is an unsaturated carbon group; each $R^1$ is selected from the group consisting essentially of an aryl group having from 6 to 10 carbon atoms and functional derivatives thereof; each $R^2$ is selected from the group consisting essentially of an alkyl group having from 1 to 4 carbon atoms and functional derivatives thereof; a has a value of 0, 1 or 2; b has a value of 0, 1, or 2 with the proviso that a+b <2; (B) curing the fiber by exposing the fiber to high energy radiation to render it non-fusible; and (C) heating the non-fusible fiber in an inert environment to a temperature above about 800° C. to convert it to a ceramic fiber.

17 Claims, No Drawings

AMORPHOUS SILICON OXYCARBIDE AND CRYSTALLINE SILICON CARBIDE FIBERS FROM CURABLE ALKENYL OR ALKYNYL FUNCTIONAL SILOXANE RESINS

BACKGROUND OF THE INVENTION

This invention relates to a method for preparing a ceramic fiber from an alkenyl or alkynyl functional siloxane resin and to the silicon oxycarbide ($SiC_xO_y$) and silicon carbide (SiC) ceramic fibers that are produced from the resin.

Currently, commercially available silicon oxycarbide fibers, such as Nicalon™ and Tyranno™ fibers, are exclusively prepared from expensive polycarbosilane precursors. Use of polycarbosilanes presents several difficulties in the production of the silicon oxycarbide fibers. For example, the polymer's slow crosslinking and the green fiber's fragility inhibit the use of continuous processing. Additionally, due to low yields and complicated processes the resulting fibers are expensive.

The use of certain siloxanes as precursors to $SiC_xO_y$ and SiC fibers is known in the art. For example, U.S. Pat. No. 5,167,881 to Atwell et al. discloses the production of silicon oxycarbide fibers from phenyl containing polyorganosiloxane resins with 3–6 wt % OH groups. U.S. Pat. No. 5,358,674 to Rabe discloses the formation of ceramic fibers from a linear polysiloxane fluid that contains a photoinitiator. The green fibers are cured by UV radiation and pyrolyzed to give ceramic fibers. The polymers disclosed by Rabe are liquid at room temperature and therefore are not suitable for melt-spinning. GB Patent 2 266 301 to Leung discloses the production of $SiC_xO_y$ black glass fibers from dry spinning of cyclosiloxane polymers, followed by thermal cure.

The siloxanes disclosed in the art are difficult to spin into fibers due predominantly to polymer's thermal instability at melt spinning temperatures. When the melting point of the polymer is low, often fibers fuse together (or stick) on contact during spinning, cure or heating thus resulting fibers that adhere to each other and cannot be separated. Due to these problems, no strong ceramic fibers (tensile strength>100 ksi) have been described in the art.

It is an object of the instant invention to provide method for producing ceramic fibers from an alkenyl or alkynyl functional resin.

It is further an object of the instant invention to provide silicon oxycarbide ($SiC_xO_y$) fibers and silicon carbide (SiC) fibers produced from the alkenyl or alkynyl functional resin.

SUMMARY OF THE INVENTION

The present invention relates to a method for preparing a ceramic fiber from alkenyl or alkynyl functional resins and to the ceramic fibers produced therefrom. The method comprises (A) forming a fiber from a siloxane resin comprised of $R^1_a R^2_b RSiO_{(3-a-b)/2}$ units wherein R is an unsaturated carbon group; each $R^1$ is selected from the group consisting essentially of an aryl group having from 6 to 10 carbon atoms and functional derivatives thereof; each $R^2$ is selected from the group consisting essentially of an alkyl group having from 1 to 4 carbon atoms and functional derivatives thereof; a has a value of 0, 1 or 2; and b has a value of 0, 1, or 2; with the proviso that $a+b \leq 2$; (B) curing the fiber by exposing the fiber to high energy radiation to render it non-fusible; and (C) heating the non-fusible fiber in an inert environment to a temperature above about 800° C. to convert it to a ceramic fiber. The alkenyl or alkynyl functional siloxane resins employed herein show excellent thermal stability at melt spin temperatures and can be melt-spun into small diameter green fibers. The green fibers exhibit fast cure and the cure can be carried out either on-line or in a batch cure fashion.

THE INVENTION

The instant invention pertains to the use of an alkenyl or alkynyl functional siloxane resin as a precursor to silicon oxycarbide ($SiC_xO_y$) and silicon carbide (SiC) fibers. The functional siloxane resins show excellent thermal stability at melt spin temperatures and can be spun into small diameter green fibers with a non-sticky surface. The method of the instant invention comprises spinning the siloxane resin into a green fiber, curing the green fiber and thereafter pyrolyzing the fiber to form the ceramic fiber.

The siloxane resins useful in the instant invention contain $R^1_a R^2_b RSiO_{(3-a-b)/2}$ units wherein R is an unsaturated carbon group; each $R^1$ is selected from the group consisting essentially of an aryl group having from 6 to 10 carbon atoms and functional derivatives thereof; each $R^2$ is selected from the group consisting essentially of an alkyl group having from 1 to 4 carbon atoms and functional derivatives thereof; a has a value of 0, 1 or 2; and b has a value of 0, 1, or 2 with the proviso that $a+b \leq 2$, preferably $a+b=0$ or 2. Preferably the siloxane resins contain $R_2^2 RSiO_{1/2}$ units.

The siloxane resins may also contain $R^1 SiO_{3/2}$ units, $R^1 SiO_{3/2}$ units and $R^1_c R^2_{(3-c)} SiO_{1/2}$ units where $R^1$ and $R^2$ are as described above.

In the above formulas $R^1$ may be exemplified by phenyl, tolyl and others, preferably phenyl. $R^2$ may be exemplified by methyl, ethyl and propylmethyl, preferably methyl. Additionally, $R^1$ or $R^2$ may be a functional derivative of the aryl or alkyl group, respectively. By functional derivative it is meant that the aryl or alkyl group may contain other functionality, organic or inorganic, so long as the functionality does not interfere with the manufacture or cure of the fibers produced herein.

R may be exemplified by vinyl, hexenyl, allyl, acetyl, propynyl and others, preferably vinyl.

Preferably the siloxane resins useful herein are of the formula $(R^1 SiO_{3/2})_q (R^2 SiO_{3/2})_r (R^1_a R^2_b RSiO_{(3-a-b)/2})_s$ where R, $R^1$, $R^2$, a and b are as described above and q has a value of 0 to 0.98; r has a value of 0 to 0.98; s is greater than zero; and $q+r+s=1$. Preferably q has a value of 0.3 to 0.5; r has a value of 0.3 to 0.5; and s has a value of 0.15 to 0.3.

More preferably the siloxane resins useful herein are of the formula $(PhSiO_{3/2})_q (CH_3 SiO_{3/2})_r ((CH_3)_2 ViSiO_{1/2})_s$ wherein Ph represents a phenyl group, Vi represents a vinyl group and q, r, and s are as described above.

The siloxane resins useful herein are well known in the art. The actual method used to prepare the siloxane resins is not critical. One such method includes acid catalyzed hydrolysis of alkoxysilanes, followed by base catalyzed condensation.

Resins produced by methods known in the art typically have a glass transition temperature below 40° C. and a broad molecular weight distribution (Mw/Mn>3). Although it is not necessary, it is desirable to fractionate the resin to produce a siloxane functional resin having a glass transition of 70° to 150° C., preferably greater than 100° C. and preferably having a Mw/Mn ratio of less than 2.5. The siloxane resin may be fractionated by any method known in the art such as precipitation such as solvent precipitation;

extraction such as solvent extraction or supercritical fluid extraction; distillation, sublimation and others. One method of solvent precipitation includes dissolving the crude resin in a solvent such as toluene; and thereafter adding the solution to methanol in order to precipitate the resin. The precipitate (the fractionated resin) is then collected and dried. The fractionated resins are particularly suited for melt-spinning.

The siloxane resins of the instant invention may be fired in an inert atmosphere or in a vacuum to a temperature of at least 800° C. until a silicon oxycarbide ceramic material is obtained. Preferably the pyrolysis temperature is 1000° C. or higher. Most preferably the pyrolysis temperature is 1200° C. to 1300° C. For the formation of silicon carbide fibers, the pyrolysis temperature is preferably about 1500° C. or greater.

The siloxane resins of the instant invention may be formed into shaped articles prior to pyrolysis. Fibers are the preferred shaped article. The siloxane resins of the instant invention may be spun into a fiber by conventional spinning techniques such as melt spinning, wet spinning or dry spinning. It is most convenient to melt the resins and extrude them through an orifice such as a spinneret (i.e. melt-spin) and then draw them into diameters of less than about 100 micrometers. More preferably, the fibers are drawn into diameters of less than 30 micrometers. The melt spinning is typically carried out at a temperature of 100° to 250° C., depending on the glass transition temperature of the resins.

The fibers are then cured (infusibilized) to render them non-fusible and to prevent them from deforming when pyrolyzed. By infusibilizing it is meant that the fiber, when heated rapidly up to the pyrolysis temperature will not fuse together. A screen for infusibility is provided by the solubility of the fiber in toluene. An infusible fiber is essentially insoluble in toluene or has a limited solubility in toluene.

The fibers are cured by exposing the fiber to high energy radiation sources such as gamma rays, x-rays and electron beam radiation, preferably electron beam radiation.

Units for producing the electron beams are known in the art and are commercially available Generally, such units comprise a heated cathode (such as tungsten filament) which cause electrons to be produced at a very high rate. The resultant electrons are then accelerated and concentrated in vacuum by a large voltage applied to the anode to form a high energy beam. The fiber is heated by absorbing the kinetic energy of these bombarding electrons. Cold cathode sources are useful for electron beam radiation and within the scope of the present invention. Typically the accelerating voltage in these units is in the range of about 0.1 to 300 keV, the vacuum is in the range of about 10 to $10^{-3}$ Pa, the electron currents range from about 0.1 milliamperes to 30 ampere and the power in the beam varies from about 0.1 watt to 90 kilowatt. The dose achieved by these means is in the range of 20 microcoulomb to 120 Mrad, preferably in the range of about 60 to 80 Mrad.

The fibers are generally exposed to the radiation for a time effective to provide the dose required to cure the fibers. Generally this can occur from within a range of about 1 millisecond to 1 hour. The fibers are radiated under an inert atmosphere, such as nitrogen. By inert atmosphere, it is meant an atmosphere containing less than 500 ppm of oxygen.

The fibers may be cured on-line during the spinning process, batch cured following the spinning process, continuously cured after the spinning process or any combination thereof. By on-line cure it is meant that the fibers are exposed to the cure mechanism as they are being formed but before they are collected on a take-up spool. By batch cure it is meant that the fibers are collected on the spool without curing, then cured by exposing the fibers to the cure mechanism.

The cured fibers are then heated (pyrolyzed) in an inert environment to a temperature above about 800° C., preferably to temperatures at or above 1000° C. to convert them to a ceramic fiber. For purposes of this invention an inert environment should contain less than 500 ppm of oxygen. The fibers are heated at the desired temperatures for a time sufficient to form the silicon oxycarbide ($SiC_xO_y$) fibers. Alternatively, the pyrolysis temperature can be ramped up, held at the desired maximum temperature and ramped down. This heating can be performed on a continuous basis or the cured fiber can be collected and batch pyrolyzed. Methods for pyrolyzing polysiloxane polymer fibers into ceramic fibers are well known in the art and can be used herein.

The silicon oxycarbide ceramic fibers of the instant invention have compositional stability up to 1300° C. and typically are comprised of 20 to 60 wt % Si, 20 to 40 wt % O and 30 to 70 wt % C.

SiC fibers may be produced by doping the fibers (spun, cured or silicon oxycarbide) with a boron source and thereafter heating the doped fibers sufficiently to remove oxygen as described in U.S. Pat. Nos. 5,071,600 to Deleeuw et al; 5,167,881 to Atwell et al.; 5,268,336 to Deleeuw et al. and 5,366,943 to Lipowitz et al. which are incorporated herein by reference for its teaching of how to produce SiC fibers.

U.S. Pat. Nos. 5,071,600, 5,167,881, 5,268,336 all teach methods wherein the fiber is doped with boron in order to produce polycrystalline SiC fibers. The incorporation of boron is accomplished either prior to or during the formation of the fibers, during at least one of the infusibilizing steps or during the initial heating period of the pyrolysis. One preferred method for doping the fibers comprises exposing the cured fibers to diborane ($B_2H_6$) gas in an inert gas such as argon. The diborane is typically present in the argon in an amount from 0.01 to about 1 percent by volume. The fibers are typically heated to a temperature of from 200° C. to 300° C., preferably from 240° to 260° C. during the exposure to the diborane.

U.S. Pat. No. 5,366,943 teaches a method comprising heating a silicon oxycarbide ceramic fiber in an environment containing a volatile sintering aid such as boron oxide (e.g. $B_2O_3$) to produce the SiC fiber. Other useful volatile sintering aids include iron, magnesium, lithium, beryllium, boron, aluminum, thorium, yttrium, lanthanum, cerium and compounds thereof.

The ceramic fibers produced by the method of the instant invention are useful as the reinforcing phase in various composite applications. It has been found that when alkenyl or alkynyl functional siloxanes resins are used to produce the fibers that continuous, non sticky fibers can be produced. Additionally the resins are easier to spin and cure than the liquid polymers.

So that those skilled in the art can understand and appreciate the invention taught herein, the following examples are presented, it being understood that these examples should not be used to limit the scope of this invention found in the claims.

EXAMPLE 1
Synthesis of vinyl functional resin 594.9 g of phenyltrimethoxysilane, 466.9 g of methyltrimethoxysilane and 201.3 g of 1,1,2,2-tetramethyl-1,2-divinyl siloxane were charged into a 5L flask equipped with a condenser and a mechanical stirrer, under argon. 10.0 g of trifluoromethane sulfonic acid dissolved in 42.8 g of deionized water was added to the flask. The mixture was heated to reflux for 90 min. Following the heating 1473 g of toluene and 642.3 g of water were added. The solution was heated to reflux for an additional 90 minutes. 19 g of calcium carbonate was then added and the solvent was distilled until the overhead temperature increased to 84° C. Additional toluene (736.2 g) was then added to adjust the solid content to 47 wt %. Aqueous 3 wt % potassium hydroxide (86 mL) was added and the water was azeotropically removed using a Dean-Stark Apparatus. After water was removed from the reaction mixture (approx. 4 hours) the reflux was continued for another 13 hours before cooling to 50°–60° C. Chlorodimethylvinylsilane (41.5 g) was added and the solution was stirred at room temperature for overnight. The solution was first filtered through a Celatom filter-aid, followed by filtration through a 0.45 micron membrane. 20 mL of the solution was then vacuum dried. NMR analysis indicates a $(PhSiO_{3/2})_{0.37}(CH_3SiO_{3/2})_{0.40}((CH_3)_2ViSiO_{1/2})_{0.23}$ formulation. The resin had a glass of 36.8° C.; $M_w$ of 10,479; $M_n$ of 2,621 and a $M_w/M_n$ of 4.00.

EXAMPLE 2

Preparation of fractionated resins.

Six (6) samples of the resin produced in Example 1 were diluted with toluene to a solid content as given in Table 1 and then added dropwise to methanol (solution/methanol 1:8 v/v) under mechanical stirring. The white precipitate was collected and dried at 160° C. for 1 hour in vacuo. The yields, molecular weight and glass transition temperature ($T_g$) of the fractionated resins are summarized in Table I.

The solvent (toluene) was removed from another sample (Sample 7) of the resin produced in Example 1 by a rotavaporator, followed by vacuum stripping at 100° C. for 2 hours The resin oligomer (44.5%) was then extracted with supercritical $CO_2$ on a bench extractor. The yield, molecular weight and glass transition temperature ($T_g$) of the fractionated resin (sample 7) is summarized in Table I.

EXAMPLE 3

Fiber spinning and cure

The vinyl functional siloxane resins prepared in Example 2 were melt-spun into single filament fibers in the 200° to 240° C. range. For melt-spinning, 5.2 g of the vinyl functional siloxane resin was ground into a fine powder with a mortar and pestle and pressed at 500 psi into a rod at low temperatures. The polymer rod was transferred into the extruder under argon. The polymer was then heated to 200° to 240° C. and fibers (13~25 micron) were taken-up (50–80 m/min) on a spool.

The green fiber tow collected on the spool was cut and laid on a piece of paper. The fibers were fixed on a clip board and spread out as much as possible and then passed through the electron beam (EB) curing zone. In a typical batch process, the fibers were exposed to electron beam radiation (20 to 120 Mrad). The fibers were cured as indicated by their insolubility in toluene.

EXAMPLE 4

Preparation of Silicon oxycarbide ($SiC_xO_y$)Fibers.

Fibers prepared in Example 3 were heated at 3° C./min to 1200° C. and held at this temperature for 1 h. Silicon oxycarbide fibers were obtained in 75 to 80% ceramic yield and were separable. Mechanical testing indicated tensile strengths of 200 to 270 ksi for the fibers having a diameter of 10 to 20 μm. The fibers had a smooth surface and glassy cross section.

EXAMPLE 5

Preparation of SiC Fibers

Cured green fibers prepared in Example 3 were hung in a quartz tube equipped with a gas inlet and a gas outlet. The tube was purged with argon for 20 min before a diborane/argon mixture (0.186% $B_2H_6$, 88 cc/min) was introduced into the tube. The tube was then heated quickly to a temperature in between 240° C. and 260° C. and held for 2 h. After the experiment, the tube was further purged with argon for 20 min. The diborane treated fibers were then heated to 1200° C. at 3° C./min and held at temperature for 1 hour before cooling to room temperature. The resulting silicon oxycarbide ceramic fibers were then heated to 1800° C. (10° C./min to 1200° C. and then 3° C./min to 1800° C.) under argon and held at 1800° C. for 10 min to produce the SiC ceramic fibers. Auger analysis of the ceramic fiber cross section exhibits near stoichiometric SiC at ca. 20 nm depth from the surface. A x-ray powder diffraction (XRD) analysis indicates over 99% β-SiC along with trace amounts of carbon.

TABLE 1

| | Resin Fractionation | | | | |
|---|---|---|---|---|---|
| Sample | Solids % | Yield % | $T_g$ (°C.) | $M_w$ | $M_n$ | $M_w/M_n$ |
| As Synthesized | | | 36.8 | 10,479 | 2,621 | 4.00 |
| 1 | 15 | 48.9 | 137.8 | 17,620 | 9,297 | 1.90 |
| 2 | 20 | 55.5 | 124.7 | 16,530 | 8,052 | 2.05 |
| 3 | 22.5 | 58.6 | 117.5 | 15,552 | 7,355 | 2.11 |
| 4 | 25 | 59.8 | 113.8 | 15,706 | 7,145 | 2.20 |
| 5 | 27.5 | 61.8 | 105.5 | 14,712 | 6,362 | 2.31 |
| 6 | 30 | 63.0 | 108.6 | 14,689 | 6,593 | 2.23 |
| 7 | 100 | 55.5 | 125 | 16,280 | 8,830 | 1.84 |

What is claimed is:

1. A method for preparing a ceramic fiber comprising
   (A) forming a fiber from a siloxane resin having the formula $(R^1SiO_{3/2})_q(R^2SiO_{3/2})_r(R^1{}_aR^2{}_bRSiO_{3-a-b/2})_s$ wherein R is an unsaturated carbon group; each $R^1$ is selected from the group consisting of an aryl group having from 6 to 10 carbon atoms and functional derivatives thereof; each $R^2$ is selected from the group consisting of an alkyl group having from 1 to 4 carbon atoms and functional derivatives thereof; a has a value of 0, 1 or 2; b has a value of 0, 1, or 2 with the proviso that a+b=0 or 2; q has a value of 0.3 to 0.5; r has a value of 0.3 to 0.5 and s has a value us 0.15 to 0.3;
   (B) curing the fiber of (A) by exposing the fiber to high energy radiation; and
   (C) heating the fiber of (B) in an inert environment to a temperature above about 800° C. to convert the fiber of (B) to a ceramic fiber.

2. The method as claimed in claim 1 wherein the fiber formed in (A) is formed by melt spinning.

3. The method as claimed in claim 1 wherein the high energy radiation is electron beam radiation.

4. The method as claimed in claim 1 wherein the siloxane resin has a glass transition temperature of 70° to 150° C.

5. The method as claimed in claim 4 wherein the siloxane resin has a glass transition temperature of 100° to 150° C.

6. The method as claimed in claim 1 wherein the siloxane resin has a $M_w/M_n$ ratio of less than 2.5.

7. The method as claimed in claim 5 wherein the siloxane resin has a $M_w/M_n$ ratio of less than 2.5.

8. The method as claimed in claim 1 wherein the fiber of (B) is heated in an inert environment to a temperature above about 1000° C.

9. A method for preparing a polycrystalline silicon carbide fiber comprising
   (A) forming a fiber from a siloxane resin having the formula $(R^1SiO_{3/2})_q(R^2SiO_{3/2})_r(R^1{}_aR^2{}_bRSiO_{3-a-b/2})_s$ wherein R is an unsaturated carbon group; each $R^1$ is selected from the group consisting of an aryl group having from 6 to 10 carbon atoms and functional derivatives thereof; each $R^2$ is selected from the group consisting of an alkyl group having from 1 to 4 carbon atoms and functional derivatives thereof; a has a value of 0, 1 or 2; b has a value of 0, 1, or 2 with the proviso that a+b=0 or 2; q has a value of 0.3 to 0.5; r has a value of 0.3 to 0.5 and s has a value us 0.15 to 0.3;
   (B) curing the fiber of (A) by exposing the fiber to high energy radiation; and
   (C) heating the fiber of (B) in an inert environment to a temperature above about 1500° C. to convert the fiber of (B) to a ceramic fiber wherein the fiber of (B) has incorporated therein at least about 0.1 wt % boron.

10. The method as claimed in claim 9 wherein the boron is incorporated into the fiber of (B) by heating the fiber of (B) in an environment comprised of 0.01 to about 1% by volume diborane in an inert gas.

11. The method as claimed in claim 9 wherein the high energy radiation is electron beam.

12. A method for preparing a polycrystalline silicon carbide fiber comprising
   (A) forming a fiber from a siloxane resin having the formula $(R^1SiO_{3/2})_q(R^2SiO_{3/2})_r(R^1{}_aR^2{}_bRSiO_{3-a-b/2})_s$ wherein R is an unsaturated carbon group; each $R^1$ is selected from the group consisting of an aryl group having from 6 to 10 carbon atoms and functional derivatives thereof; each $R^2$ is selected from the group consisting of an alkyl group having from 1 to 4 carbon atoms and functional derivatives thereof; a has a value of 0, 1 or 2; b has a value of 0, 1, or 2 with the proviso that a+b=0 or 2; q has a value of 0.3 to 0.5; r has a value of 0.3 to 0.5 and s has a value us 0.15 to 0.3;
   (B) curing the fiber of (A) by exposing the fiber to high energy radiation; and
   (C) heating the fiber of (B) in an inert environment to a temperature above about 800° C. to convert the fiber of (B) to a ceramic fiber; and
   (D) thereafter heating the ceramic fiber in an environment containing a volatile sintering aid selected from the group consisting of iron, magnesium, lithium, beryllium, boron, aluminum, thorium, yttrium, lanthanum, cerium and compounds thereof to a temperature to convert the ceramic fiber to a polycrystalline silicon carbide fiber and for a time sufficient to allow incorporation of the sintering aid into the ceramic fiber.

13. The method as claimed in claim 12 wherein the volatile sintering aid is a boron compound.

14. The method as claimed in claim 13 wherein the volatile sintering aid is boron oxide.

15. The method as claimed in claim 12 wherein the high energy radiation is electron beam.

16. The method as claimed in claim 1 wherein a+b=0.

17. The method as claimed in claim 1 wherein the siloxane resin has the formula $(PhSiO_{3/2})_q(CH_3SiO_{3/2})_r((CH_3)_2ViSiO_{3-a-b/2})_s$ wherein Ph represents a phenyl group and Vi represents a vinyl group.

* * * * *